(12) United States Patent
Adams

(10) Patent No.: US 8,756,859 B2
(45) Date of Patent: Jun. 24, 2014

(54) STACKABLE ELEVATED PLANTER

(75) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 117 days.

(21) Appl. No.: 12/757,585

(22) Filed: Apr. 9, 2010

(65) Prior Publication Data

US 2011/0247268 A1 Oct. 13, 2011

(51) Int. Cl.
*A01G 9/02* (2006.01)
(52) U.S. Cl.
USPC .............................. 47/18; 47/39; 47/86
(58) Field of Classification Search
USPC ......... 47/18, 83, 39, 86; 4/594; 206/515, 518, 206/519, 517
See application file for complete search history.

(56) References Cited

U.S. PATENT DOCUMENTS

| | | | |
|---|---|---|---|
| 1,405,568 A | | 2/1922 | Conklin |
| 1,688,407 A | * | 10/1928 | Wastak ............................. 47/14 |
| 2,053,830 A | * | 9/1936 | Hunker ...................... 211/85.24 |
| 2,328,503 A | * | 8/1943 | Schmitt, Jr. .................... 269/312 |
| 3,384,230 A | * | 5/1968 | Mustee .......................... 206/320 |
| 3,772,827 A | * | 11/1973 | Ware ................................ 47/39 |
| D236,569 S | | 9/1975 | Kramer |
| 4,276,720 A | * | 7/1981 | Lyon ................................ 47/39 |
| 4,739,580 A | | 4/1988 | Simmons et al. |
| 5,040,328 A | * | 8/1991 | Coon ............................... 47/1.1 |
| D359,930 S | | 7/1995 | Tuttle |
| D376,964 S | | 12/1996 | Lewy |
| 5,727,857 A | * | 3/1998 | Smith ........................... 312/114 |
| 5,806,242 A | | 9/1998 | Park |
| D422,936 S | | 4/2000 | Tsou |
| 6,161,228 A | * | 12/2000 | Wietecha .......................... 4/625 |
| 6,243,985 B1 | * | 6/2001 | Miller ............................... 47/39 |
| 6,401,387 B1 | * | 6/2002 | Diloreto et al. ................ 47/66.6 |
| 6,907,693 B1 | | 6/2005 | Bemben |
| 7,340,859 B2 | | 3/2008 | Palsrok |
| 7,395,630 B2 | * | 7/2008 | Schomaker et al. .............. 47/39 |
| D606,773 S | | 12/2009 | Copp et al. |
| 7,634,871 B2 | * | 12/2009 | DiPaolo et al. ................ 47/66.2 |
| D624,335 S | | 9/2010 | Lutz et al. |
| D643,647 S | | 8/2011 | Owen et al. |

(Continued)

*Primary Examiner* — Rob Swiatek
*Assistant Examiner* — Kathleen Alker
(74) *Attorney, Agent, or Firm* — Buchanan Ingersoll & Rooney PC

(57) ABSTRACT

A stackable elevated planter has a rectangular or oval body that holds potting soil. Two or four legs sockets are attached to and extend away from the bottom of the planter body to define a rectangle. Legs are provided such that each leg has one end sized to fit within one of the leg sockets. The legs have a length less that the length of the rectangle and an average width which is less than one fourth of the width of the rectangle such that the four legs can be laid next to one another within the planter body and a similar second planter will fit within that planter. The body of the second planter may be positioned over the four legs such that the leg sockets of the second planter body extend beyond the four legs and the leg sockets of the second planter may rest on the top surface of the base of the first planter. An optional shelf that fits within the planter body for storage and is attached to the legs when the planter is assembled may also be provided. In another embodiment the legs can be filled with water and a wick may extend from each leg into the planter body.

10 Claims, 5 Drawing Sheets

(56) References Cited

U.S. PATENT DOCUMENTS

2006/0070298 A1* 4/2006 Palsrok ........................ 47/66.3
2006/0112634 A1 6/2006 Vogt
2008/0129164 A1* 6/2008 Walsh ........................ 312/228.1
2009/0277085 A1 11/2009 Stewart
2013/0086742 A1* 4/2013 Didehvar et al. ................. 4/631

* cited by examiner

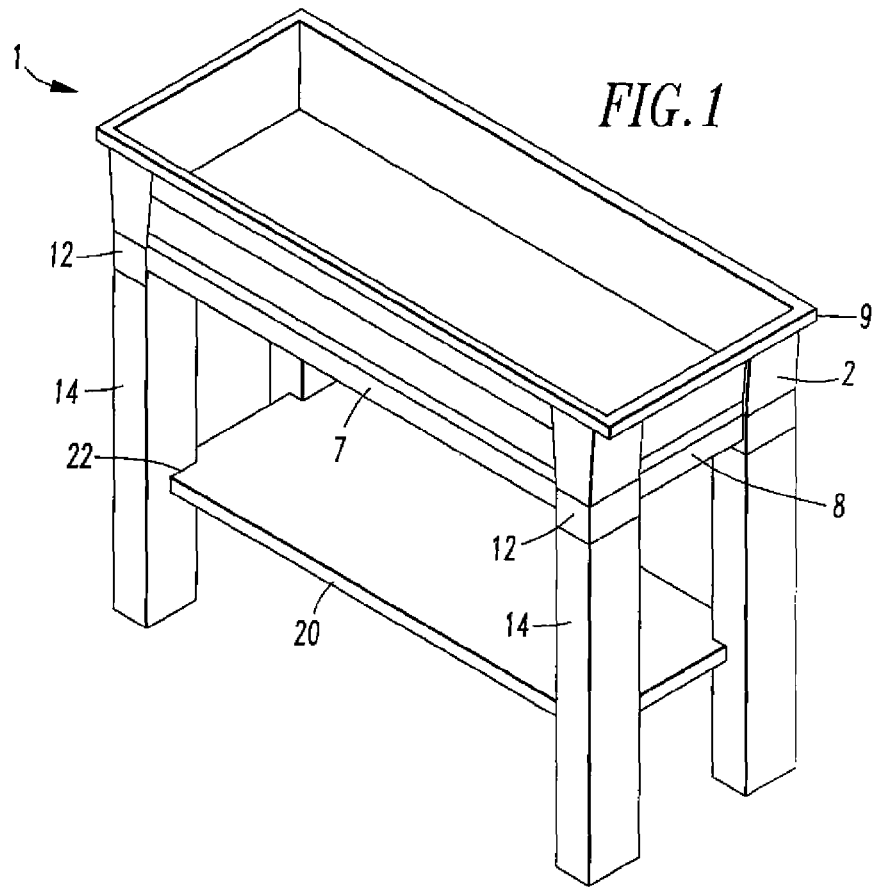
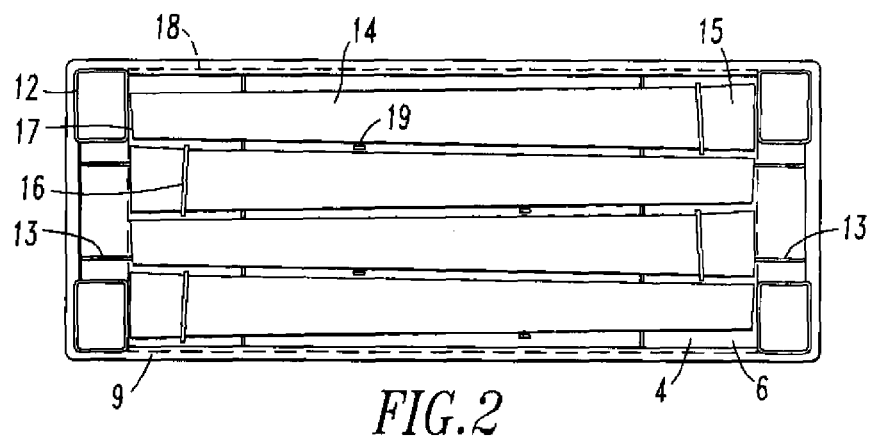

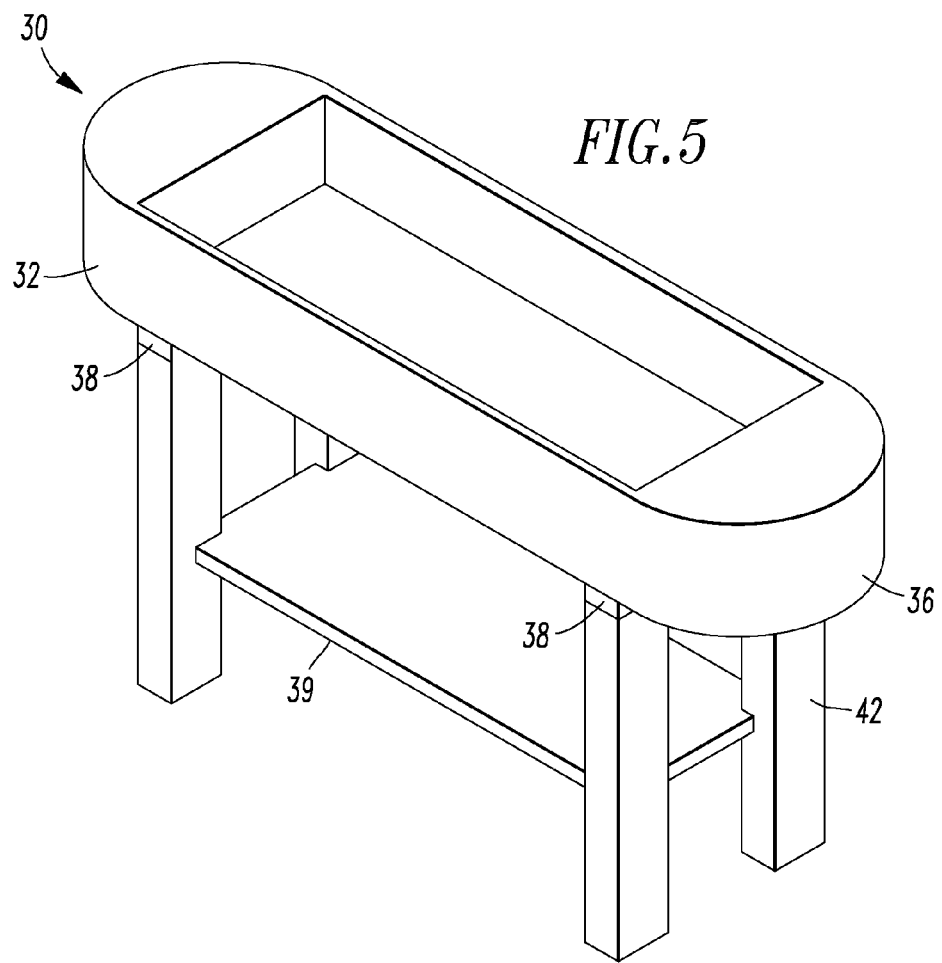
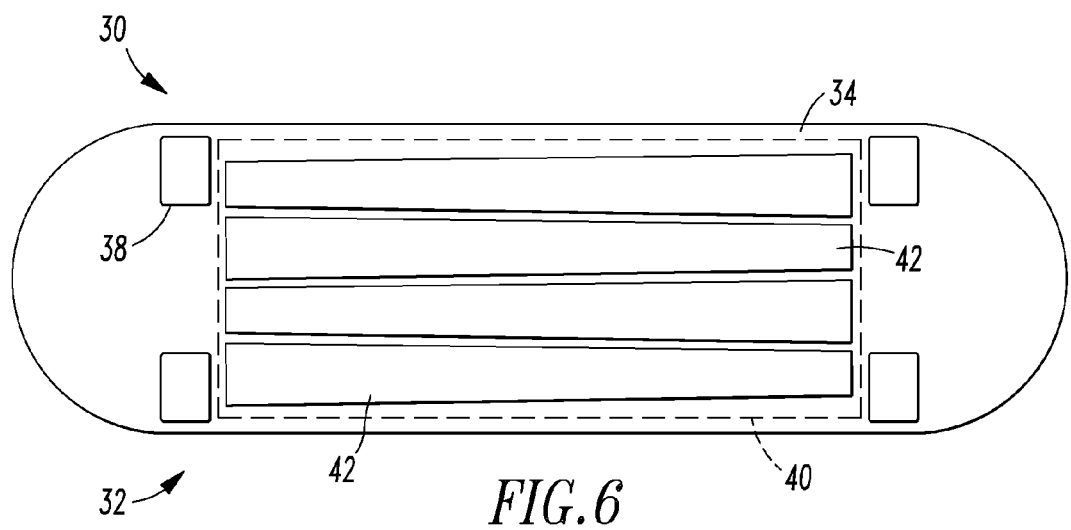

STACKABLE ELEVATED PLANTER

FIELD OF INVENTION

The invention relates to planters for flowers and other plants.

BACKGROUND OF THE INVENTION

There are a variety of planters available in the marketplace for flowers and other plants. The planters have a body which defines a cavity in which potting soil is held. Most planters in the market are molded plastic. Others are made from materials such as fiber, porcelain, clay, foam, and metal. These planters are typically made into the same shapes such as pots, bowls and window boxes that are often low to the ground and only have one purpose or use.

Consumers prefer planters that can be flexibly used in different circumstances to create a desired aesthetic appearance. For example, a multi-purpose planter that can be raised and supported on legs, or transformed to be used without legs on a deck, patio or porch, provides more options for the consumer. Furthermore, many consumers want the ability to use the planter outside as well as inside is another advantage.

Another important consideration is that retailers have limited space in which to display products being offered for sale. Consequently, there is a preference for products that can be stacked or nested thereby providing more units in a given volume. The unit cost to ship and store products which are nested together is significantly less that the storage and shipping costs of products which cannot be nested. One of the most important cost factors in this industry is transportation. It is critical that the planters can be tightly packed and condensed for transport.

Because of the premium on space manufacturers have made and sold raised planters and tables constructed from multiple parts that are sold in a box and must be assembled by the buyer. In a retail setting it is very important that the consumer can easily and quickly understand how to assemble those products that require assembly and to envision what the product will look like when it is assembled. It is also important that this is done without requiring assembly and without accessory parts such as bolts, nuts, and washers. Indeed, many consumers prefer products that can be assembled without the use of tools.

The art has developed planters with folding legs such as are disclosed in U.S. Pat. No. 7,340,859 and stackable planters such as are disclosed in U.S. Pat. No. 5,806,242 and Des Pat. No. 422,936. Planters having folding legs are not easily stacked when fully assembled. The stackable planters are not elevated. Thus, there is a need for a stackable, elevated planter which can be easily assembled, is durable and can be tightly stacked with other similar planters for shipment and sale.

SUMMARY OF THE INVENTION

I provide a stackable elevated planter which has a rectangular or oval body that holds potting soil. The planter body has a rectangular or oval base having a length, width, a top surface, a bottom and a perimeter. Walls connected to the perimeter of the base extend away from the top surface of the base to define a cavity having a cavity length, a cavity width and a cavity depth. Four legs sockets are attached to and extend away from the bottom of the base to define a rectangle. There is a first length between a pair of adjacent legs sockets along a length of that rectangle and a first width between a second pair of leg sockets along a width of the rectangle. Four legs, each leg having one end sized to fit within one of the leg sockets are provided. The legs have a length less that the first length and a width which is less than one fourth of the width of the rectangle such that the four legs can be laid side by side on the base and within the cavity and a similar second planter having a body with four legs sockets can be placed within the cavity. The body of the second planter may be positioned over the four legs such that the leg sockets of the second planter body extend beyond the four legs and the leg sockets of the second planter may rest on the top surface of the rectangular base.

I further prefer to provide a shelf that fits within the cavity of the planter body for shipment and attaches to the legs when the elevated planter is assembled.

The planter could be made with two rather than four legs. The legs can be filled with water and a wick may extend from each leg into the planter body.

The elevated planter can be made of plastic, is easy to assemble and is very durable. Because of the shape of the planter body and the dimensions of the legs multiple planters can be nested together and tightly stacked.

Other objects and advantages of the present invention will become apparent from a description of certain present preferred embodiments thereof show in the drawings.

BRIEF DESCRIPTION OF THE FIGURES

FIG. 1 is a perspective view of present preferred embodiment of my a planter showing the planter in an assembled condition for use.

FIG. 2 is a bottom view of the planter shown in FIG. 1 with the legs removed and placed against the bottom surface of the planter body to show that the legs are sized so that all four legs can fit side-by-side below and against the bottom surface of the planter.

FIG. 5 is a perspective view of a second present preferred embodiment of my a planter showing the planter in an assembled condition for use.

FIG. 6 is a bottom view of the planter shown in FIG. 5 with the legs removed and placed against the bottom surface of the planter body.

DESCRIPTION OF PREFERRED EMBODIMENTS

Figure 3:
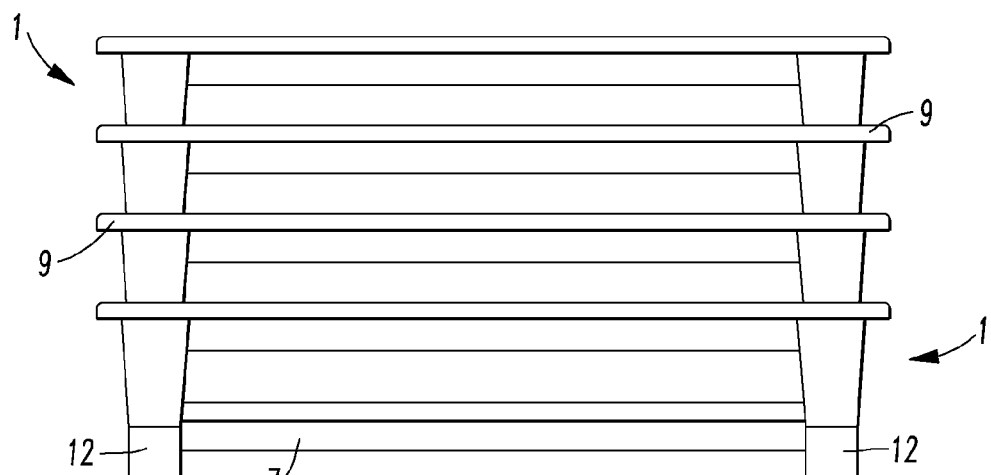
FIG. 3 is a side view of four planters of the type shown in FIGS. 1 and 2 disassembled and stacked for storage and shipment.

The first present preferred embodiment of my elevated planter 1 is shown in FIGS. 1 through 4. I provide a planter body 2 having a base 4 sidewalls 7 and endwalls 8. These walls extend from the perimeter of the base 4 away from the top surface 5 of the base to define an open unobstructed, generally rectangular cavity 3 in which potting soil is placed. I prefer to provide a lip 9 which extends outwardly from the sidewalls 7 and endwalls 8. I also prefer to provide a drain hole 10 and drain plug 11 in the base 4 of the planter body.

Four leg sockets 12 extend from the base. There is one leg socket at each corner of the rectangular base. I also prefer to provide ribs 14 across the bottom surface 6 of the base for added strength.

Figure 4:
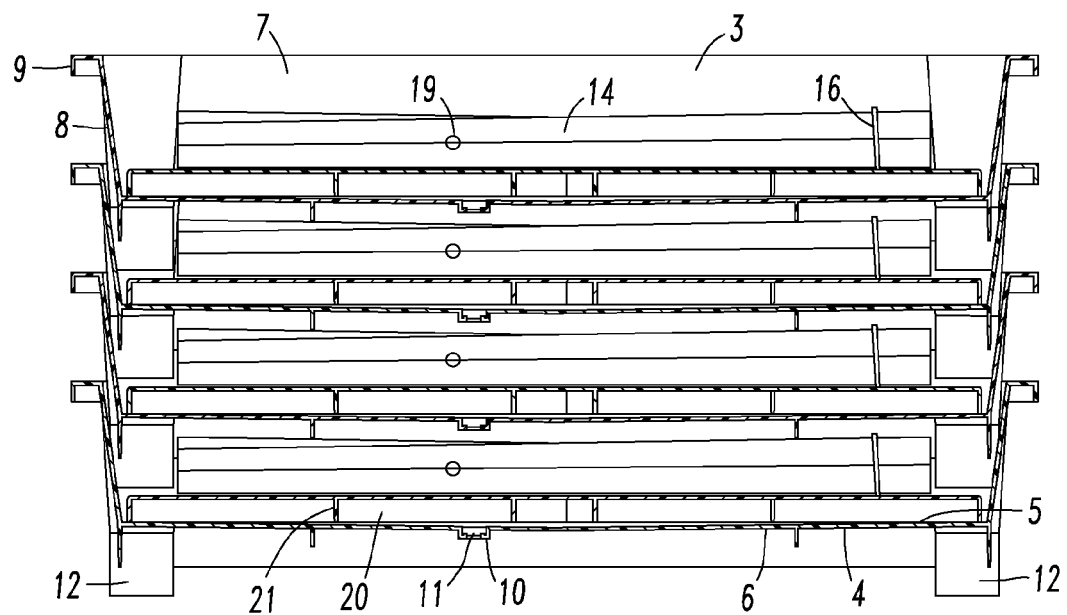
FIG. 4 is a sectional view taken along the line IV-IV in FIG. 3.

One end 15 of each leg 14 is removably inserted into a leg socket 12. I prefer to provide an annular collar 16 on each leg that is spaced a distance of about two to three inches from the end of the leg 15 which is inserted into the leg socket 12. The collar prevents a leg from being inserted into the leg socket a distance more than the distance from the end of the leg to the collar. Furthermore, by providing this collar one can assure that all of the legs 14 are inserted the same distance into the leg sockets. I prefer to provide a pin 19 on each leg as shown in FIGS. 2 and 4. A slot (not shown) is provided in the sides of the shelf to receive each pin. Shelf 20 is hung on these pins. This shelf provides not only a storage space but also adds stability to the assembled elevated planter. I further prefer to provide ribs 21 on the bottom of the shelf for added strength. Notches 22 are provided in the corners of the shelf 20 so that the shelf extends around the legs.

Figure 10:
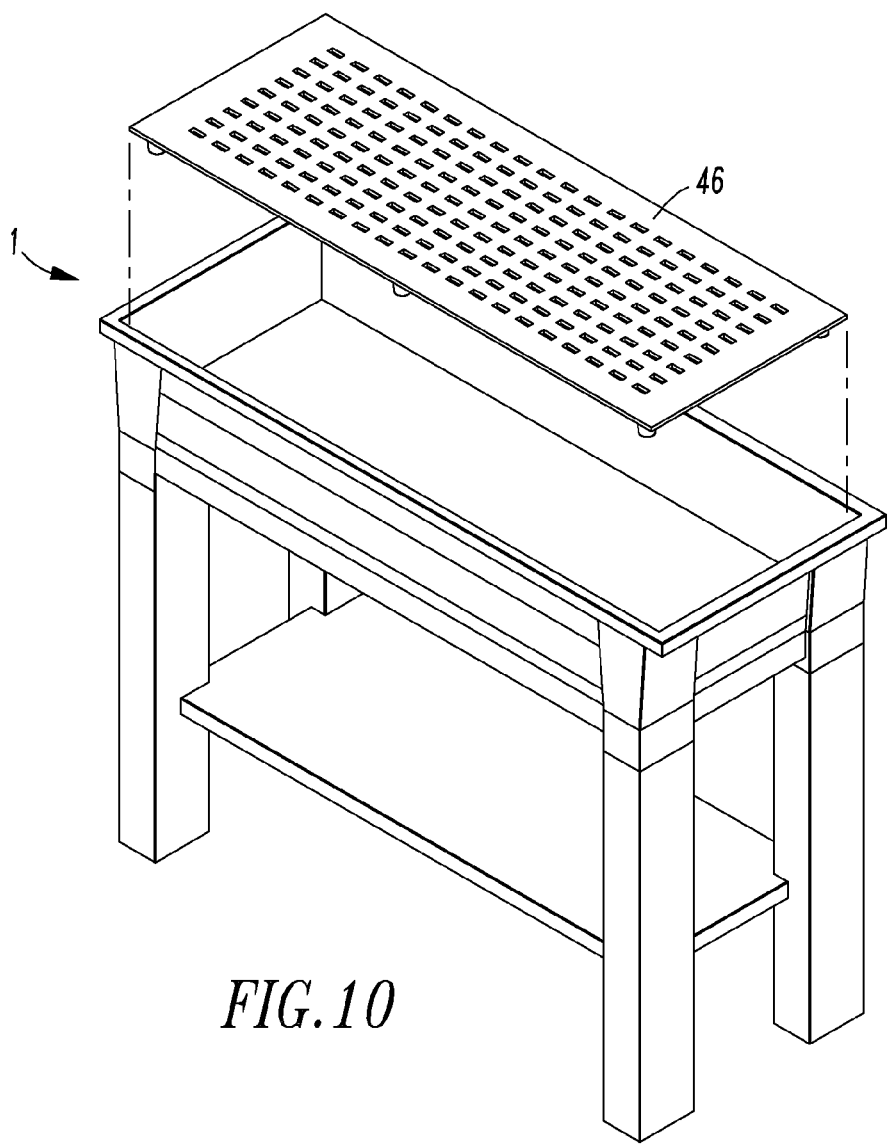
FIG. 10 is a perspective view of the planter shown in FIG. 1 with an optional insert.

As shown in FIG. 10 I may provide a spacer sheet 46 having legs which fits on the planter body 2. This sheet keeps the soil away from the bottom of the planter body and provides a space into which water may drain. A plurality of openings are provided in the spacer sheet.

Referring to FIG. 2 leg sockets 12 define a rectangular area indicated by dotted line 18 in FIG. 2, on the bottom surface 6 of base 4 of the planter body 2. Legs 14 have a length from the upper end 15 to the bottom 17 of the leg which is slightly less than the length of rectangle 18. The legs may have a uniform cross section along their lengths or may be tapered. When the legs are tapered, as in the present preferred embodiment, the width of the leg at the top end 15 maybe greater than the width of the leg at the bottom end 17. The average cross section of each leg is such that the average cross-sectional of each leg is not greater than one fourth of the width of rectangle 18. By sizing the legs this way four legs 12 can fit side-by-side against the bottom surface 6 of the planter body in between the leg sockets 14 as shown in FIG. 2. Consequently, the planter can be disassembled for shipment or storage by placing the shelf 20 and legs 14 inside the cavity 3 of the planter body and then a second similar planter disassembled in the same manner can be placed on top of the first planter. This can be seen most clearly in FIG. 4. When the planters are stacked in this manner the leg sockets of one planter are on either side of the legs of a second planter into which that one planter has been placed. Consequently several of these planters when stacked and nested together they form a very dense stack for storage and shipment.

Figure 9:
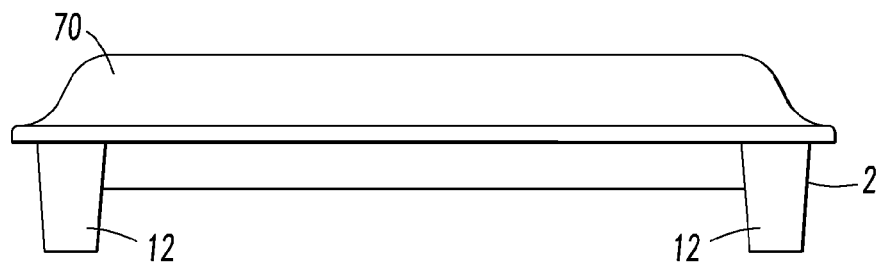
FIG. 9 is a side view of the planter shown in FIGS. 1 through 4 without legs and having a cover.

While I prefer to use the planter in the fully assembled condition shown in FIG. 1, the planter could also be used without the legs as shown in FIG. 9. When used in this manner the leg sockets 12 would act as feet.

A second present preferred embodiment of my planter 30 is shown in FIGS. 5 and 6. This embodiment further is quite similar to the first embodiment but has an oval base 34. Sidewall 36 extends from the perimeter of the base 34 to form the planter body 32. Leg sockets 38 are provided on the base 32 of the planter body 32. These legs sockets define a rectangle 40 into which legs 42 may be laid side-by-side for storage and shipment. As in the first embodiment we also to provide a shelf 39 which is attached to the legs 42 in a similar manner as the first embodiment. This embodiment could also be used without the legs. One could also extend the curved ends of the planter body to create a round planter.

Figure 7:
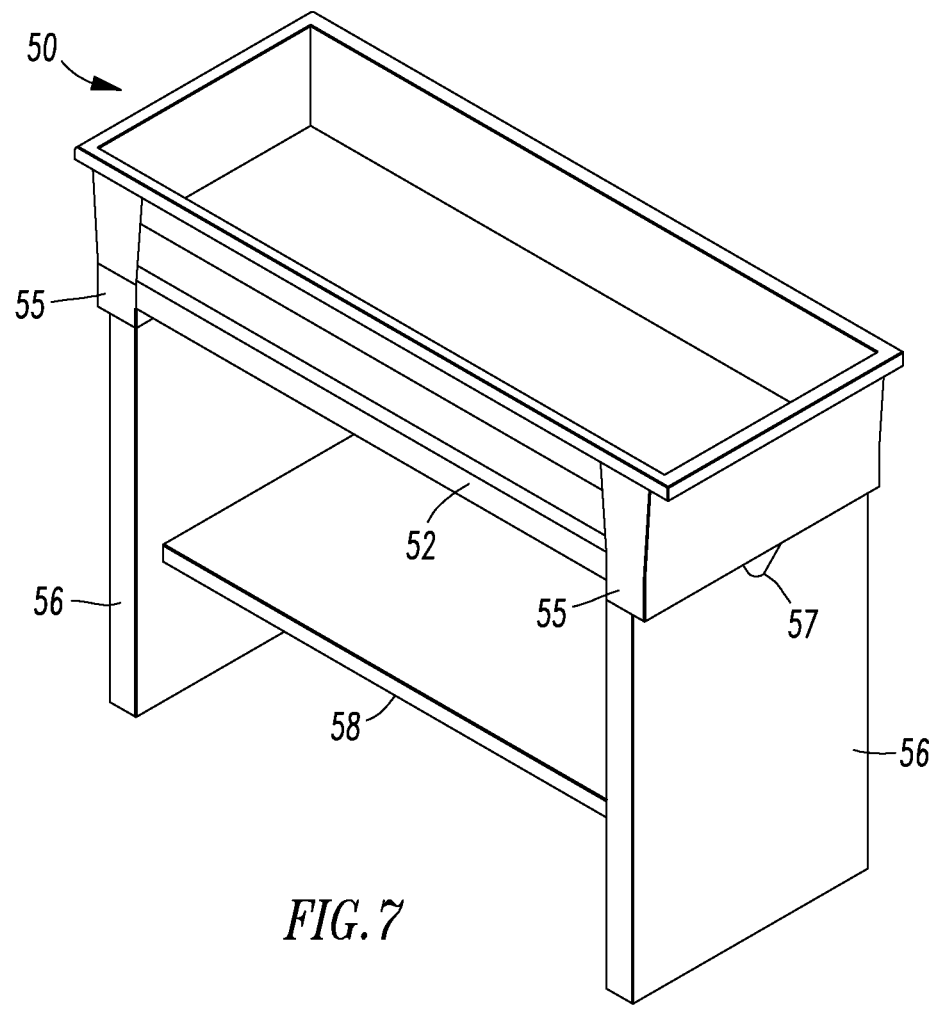
FIG. 7 is a perspective view of a third present preferred embodiment of my planter showing the planter in an assembled condition for use.
Figure 8:
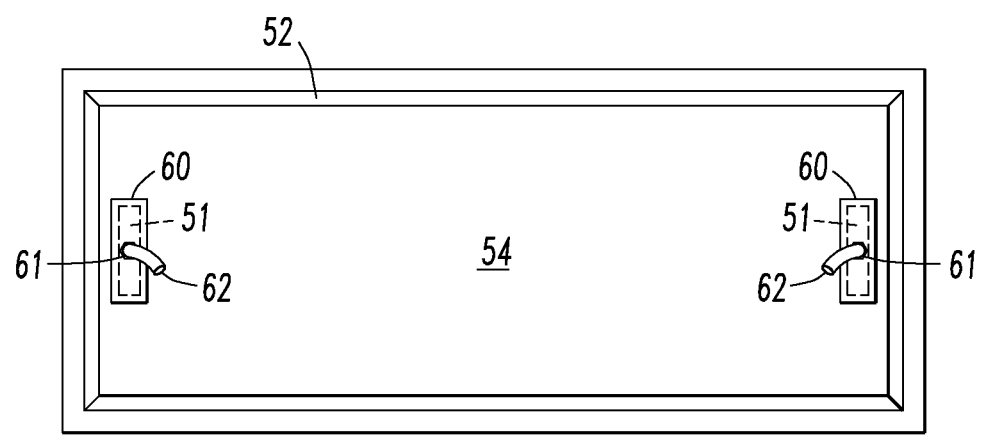
FIG. 8 is a top view of the planter shown in FIG. 7.

A third present preferred embodiment 50 shown in FIGS. 7 and 8 has a planter body 52 having a base 54 and a pair of legs 56 that fit into leg sockets 55 on the planter body. In this embodiment the legs and leg sockets extend across opposite ends of the planter body. I prefer to use the legs 56 as a water reservoir for the plants. Therefore, I provide a fill spout 57 on each leg.

Referring to FIG. 8 I provide an opening 51 at either end of the planter body 52. At least a portion of the top of each leg is open and each opening 51 aligns with the open top of one leg. An optional removable cover 60 is provided over each opening 51. A wick 62 extends through an opening 61 in each cover to the bottom of the leg. The wick draws water from the leg into planting soil (not shown) that is put in the planter. If desired, one could provide similar features in the embodiment shown in FIGS. 1 through 6 so that the legs in that embodiment could be used as a water reservoir.

As in the previous embodiments, legs 56 are sized to fit within the planter body 52 for shipment and storage. When placed in the planter body the two legs would be placed one on top of another permitting multiple planters to be stacked and nested as in the embodiment at FIGS. 1 through 4. A removable shelf 58 may also be provided that also fits within the planter body for storage and shipment.

Depending upon the size of the legs, the planter may hold several gallons of water in the legs. Consequently, plants grown in this planter could thrive for several days or even weeks without watering or refilling the legs with water.

As shown in FIG. 9 a removable transparent cover 70 may be provided on the planter. The cover should be a size to fit within the planter body when inverted and receive the legs of the planter for storage. The shelf and cover could be sized so that the shelf fits in or under the cover for storage.

The planter body, legs and shelf of both embodiments of my elevated planter are preferably made from injection molded plastics such as polycarbonate or polyvinylchloride. For ease of molding I prefer that the walls be tapered, as can be seen in FIG. 4, rather than be perpendicular to the base. The legs and shelf can be easily attached to the planter body without the need for any tools or fasteners. It is also easy to disassemble the elevated planter box for storage.

Although I have described and illustrated certain present preferred embodiments of my elevated planter box it should be distinctly understood that the invention is not limited to but may be variously embodied within the scope of the following claims.

The invention claimed is:

1. A stackable elevated planter comprising:
   a planter body comprised of:
   a rectangular base having a length, width, four corners, a top surface, a bottom surface and a perimeter; and
   a pair of side walls and a pair of end walls connected to the perimeter of the base and extending away from the top surface of the base, wherein each side wall has a smooth planar surface extending a full length of the side wall, each end wall has a smooth planar surface extending a full length of the end wall and the planar surface of each side wall meets the planar surface of each end wall, such that the side walls, the end walls and the top surface of the base define a rectangular cavity having a cavity length and a cavity width;
   four leg sockets attached to and extending away from the bottom surface of the base, one of the leg sockets located at each corner of the base, the leg sockets sized and positioned such that all four leg sockets will fit within a second cavity that is not larger than the rectangular cavity defined by the side walls, the end walls and the base, and such that there is a first length between a pair of adjacent leg sockets of the leg sockets along a direction parallel to one of the side walls and a first width between a second pair of leg sockets of the leg sockets along a direction parallel to one of the end walls; such that the leg sockets, the first length, the first width and the bottom surface of the base define a rectangular receiving cavity; and four legs, each leg having one end sized to fit within one of the leg sockets, each leg removably attached to one of the leg sockets, each leg having a length less than the first length and an average width which is less than one fourth of the first width of the rectangular receiving cavity such that the four legs can be laid side to side against the bottom surface of the rectangular base and fit within the rectangular receiving cavity and when laid side to side in this manner all four legs will be in direct contact with the bottom surface, and such that the planter body and four legs when laid side to side against the bottom surface of the rectangular base within the rectangular receiving cavity will fit within a second planter body having a same size and shape as the planter body when placed on the second planter body and nest within the second planter body.

2. The planter of claim 1 also comprising a shelf sized to fit within the rectangular cavity and be attached to the four legs when the legs are in the leg sockets.

3. The planter of claim 2 wherein the shelf has a bottom surface and also comprising a plurality of ribs on the bottom surface of the shelf.

4. The planter of claim 1 wherein the base has a drain hole and further comprising a plug removably positioned within the drain hole.

5. The planter of claim 1 wherein the planter body and the legs are plastic.

6. The planter of claim 1 also comprising a lip extending from each of the side walls and the end walls.

7. The planter of claim 1 wherein the side walls and the end walls are tapered.

8. The planter of claim 1 also comprising a collar on each leg, the collar positioned a selected distance from the one end of the leg that is sized to fit within one of the leg sockets.

9. The planter of claim 1 also comprising a removable cover sized to fit over the planter covering all of the generally rectangular cavity for use and fit within the planter body for storage.

10. The planter of claim 1 also comprising a spacer sheet having a plurality of openings and positioned on the top surface of the base.

\* \* \* \* \*